US008380402B2

(12) United States Patent
Hobenshield

(10) Patent No.: US 8,380,402 B2
(45) Date of Patent: Feb. 19, 2013

(54) CONTROL SYSTEMS AND METHODS FOR HEAVY EQUIPMENT

(75) Inventor: Lane C. Hobenshield, Oak Creek, WI (US)

(73) Assignee: Bucyrus Intl. Inc., South Milwaukee, WI (US)

( * ) Notice: Subject to any disclaimer, the term of this patent is extended or adjusted under 35 U.S.C. 154(b) by 205 days.

(21) Appl. No.: 12/882,101

(22) Filed: Sep. 14, 2010

(65) Prior Publication Data

US 2012/0065847 A1 Mar. 15, 2012

(51) Int. Cl.

| | |
|---|---|
| ***G06F 7/70*** | (2006.01) |
| ***G06F 19/00*** | (2006.01) |
| ***G06G 7/00*** | (2006.01) |
| ***G06G 7/76*** | (2006.01) |

(52) U.S. Cl. ................ 701/50; 172/9; 172/50; 180/315; 180/321; 180/324; 700/83

(58) Field of Classification Search ..................... 701/50
See application file for complete search history.

(56) References Cited

U.S. PATENT DOCUMENTS

| | | | | |
|---|---|---|---|---|
| 4,645,030 | A | 2/1987 | von Bernuth et al. | |
| 4,738,417 | A | 4/1988 | Wenger | |
| 4,819,896 | A | 4/1989 | Narad | |
| 5,002,454 | A | 3/1991 | Hadank et al. | |
| 5,704,429 | A | 1/1998 | Lee et al. | |
| H1831 | H | 2/2000 | Kelley et al. | |
| 6,025,686 | A | 2/2000 | Wickert et al. | |
| 6,542,789 | B2 | 4/2003 | Ufheil | |
| 6,571,902 | B2 * | 6/2003 | Heyne et al. | 180/321 |
| 6,644,141 | B2 | 11/2003 | Oikarinen | |
| 6,675,508 | B2 | 1/2004 | Tamaru et al. | |
| 6,856,035 | B2 * | 2/2005 | Brandon et al. | 290/40 C |
| 6,880,855 | B2 | 4/2005 | Chernoff et al. | |
| 6,932,113 | B1 | 8/2005 | Kauss | |
| 7,188,991 | B1 | 3/2007 | Weiler | |
| 7,293,625 | B2 | 11/2007 | Kumazawa | |
| 7,334,658 | B2 | 2/2008 | Berg et al. | |
| 7,458,439 | B2 | 12/2008 | Catton et al. | |
| 7,497,298 | B2 | 3/2009 | Shearer et al. | |
| 7,681,686 | B1 | 3/2010 | Klas et al. | |
| 7,729,835 | B2 * | 6/2010 | Morris et al. | 701/50 |
| 2002/0074181 | A1 | 6/2002 | Brandt et al. | |
| 2002/0166267 | A1 | 11/2002 | McGugan | |
| 2002/0178624 | A1 | 12/2002 | Yamamoto et al. | |

(Continued)

OTHER PUBLICATIONS

International Search Report and Written Opinion for International Application No. PCT/US2011/050661, mail date Apr. 17, 2012, 7 pages.

*Primary Examiner* — Thomas Tarcza
*Assistant Examiner* — Tyler J Lee
(74) *Attorney, Agent, or Firm* — Foley & Lardner LLP

(57) ABSTRACT

Heavy equipment includes a main body, a drivetrain, a work implement, and a control system. The drivetrain includes a first and second actuator providing speed and direction movement of the heavy equipment. The work implement includes a third and fourth actuator providing position and orientation of the work implement. The control system includes first and second main interfaces and first and second auxiliary interfaces, to allows an operator to simultaneously control the drivetrain and the work implement. The first main interface is operated by a first hand of the operator, and the control system operates the third actuator responsive to a signal from the first main interface. The first auxiliary interface is integrated with the first main interface, and operates simultaneously with the first main interface by a finger of the first hand. The control system operates the first actuator responsive to a signal from the first auxiliary interface.

20 Claims, 5 Drawing Sheets

U.S. PATENT DOCUMENTS

| | | | | |
|---|---|---|---|---|
| 2005/0102866 | A1 | 5/2005 | Sewell et al. | |
| 2009/0026001 | A1 | 1/2009 | Shaum | |
| 2009/0164065 | A1 * | 6/2009 | Daniels et al. | 701/41 |
| 2009/0223735 | A1 | 9/2009 | Ruhter et al. | |

* cited by examiner

CONTROL SYSTEMS AND METHODS FOR HEAVY EQUIPMENT

BACKGROUND

The present disclosure relates generally to the field of control systems, such as control systems for operating heavy equipment.

Heavy equipment is typically operated by way of both hand controllers, such as steering wheels, levers, stick shifts, and the like, and foot controllers, such as pedals for clutch, throttle and brake operation. As such, by way of both the hand and foot controllers, the operator may drive the heavy equipment and also operate a work implement of the heavy equipment, such as a drill, bucket, breaker, or other implement.

SUMMARY

One embodiment relates to heavy equipment that includes a main body, a drivetrain, a work implement, and a control system. The drivetrain includes a first actuator and a second actuator, and is coupled to the main body and configured to facilitate movement of the heavy equipment. The first and second actuators of the drivetrain provide both speed and direction for the movement of the heavy equipment. The work implement includes a third actuator and a fourth actuator, and is coupled to the main body. The third and fourth actuators provide the position and orientation of the work implement. The control system for the heavy equipment includes first and second main interfaces as well as first and second auxiliary interfaces, where the control system allows an operator to simultaneously control the drivetrain and the work implement. The first main interface is configured for operation by a first hand of the operator, and the control system operates the third actuator at least partially as a function of a signal provided by the first main interface. The first auxiliary interface is integrated with the first main interface, and is configured for simultaneous operation with the first main interface by a finger of the first hand. The control system operates the first actuator at least partially as a function of a signal provided by the first auxiliary interface. The second main interface is configured for operation by a second hand of the operator, and the control system operates the fourth actuator at least partially as a function of a signal provided by the second main interface. The second auxiliary interface is integrated with the second main interface, and is configured for simultaneous operation with the second main interface by a finger of the second hand. The control system operates the second actuator at least partially as a function of a signal provided by the second auxiliary interface.

Another embodiment relates to heavy equipment configured for mining, excavation, and construction applications. The heavy equipment includes a main body, a drivetrain, a work implement, and a control system. The main body is configured to support an operator of the heavy equipment. The drivetrain is coupled to the main body and configured to facilitate movement of the heavy equipment. In addition, the drivetrain includes a first actuator, a first track, a second actuator, and a second track, where the first actuator is coupled to the first track and the second track is coupled to the second track. The first and second actuators drive the respective tracks. The work implement is coupled to the main body, and includes a third actuator and a fourth actuator. The third and fourth actuators provide the position and orientation of the work implement. The control system for the heavy equipment includes a first joystick, a first switch, a second joystick, and a second switch, and is coupled to the main body, allowing the operator to simultaneously control the drivetrain and the work implement from the main body. The control system operates the third actuator at least partially as a function of a signal provided by the first joystick. The first switch is integrated with the first joystick, and the control system operates the first track by way of the first actuator at least partially as a function of a signal provided by the first switch. The signal provided by the first switch is independent from the signal provided by the first joystick. The control system operates the fourth actuator at least partially as a function of a signal provided by the second joystick. The second switch is integrated with the second joystick, and the control system operates the second track by way of the second actuator at least partially as a function of a signal provided by the second switch. The signal provided by the second switch is independent from the signal provided by the second joystick. The first and second switches may each be used to change the rotation speed and direction of the respective track, together controlling the speed and direction of the heavy equipment.

Yet another embodiment relates to a control system for operating two or more sub-systems. The control system includes a first joystick, a first auxiliary interface, a second joystick, and a second auxiliary interface. The first joystick is moveable in at least four directions, and provides a first signal that is at least partially a function of the direction in which the first joystick is moved. The first auxiliary interface is integrated with and coupled to a side of the first joystick. Further, the first auxiliary interface is operable in at least two positions, and provides a second signal that is at least partially a function of the position in which the first auxiliary interface is operated. The second joystick is moveable in at least four directions, and provides a third signal that is at least partially a function of the direction in which the second joystick is moved. The second auxiliary interface is integrated with and coupled to a side of the second joystick. Further, the second auxiliary interface is operable in at least two positions, and provides a fourth signal that is at least partially a function of the position in which the second auxiliary interface is operated. The first and third signals together at least partially control the operation of a work-implement sub-system, and the second and fourth signals together at least partially control the operation of a propel sub-system. The work-implement and propel sub-systems are simultaneously controllable independent of each other by way of the respective joysticks and auxiliary interfaces.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
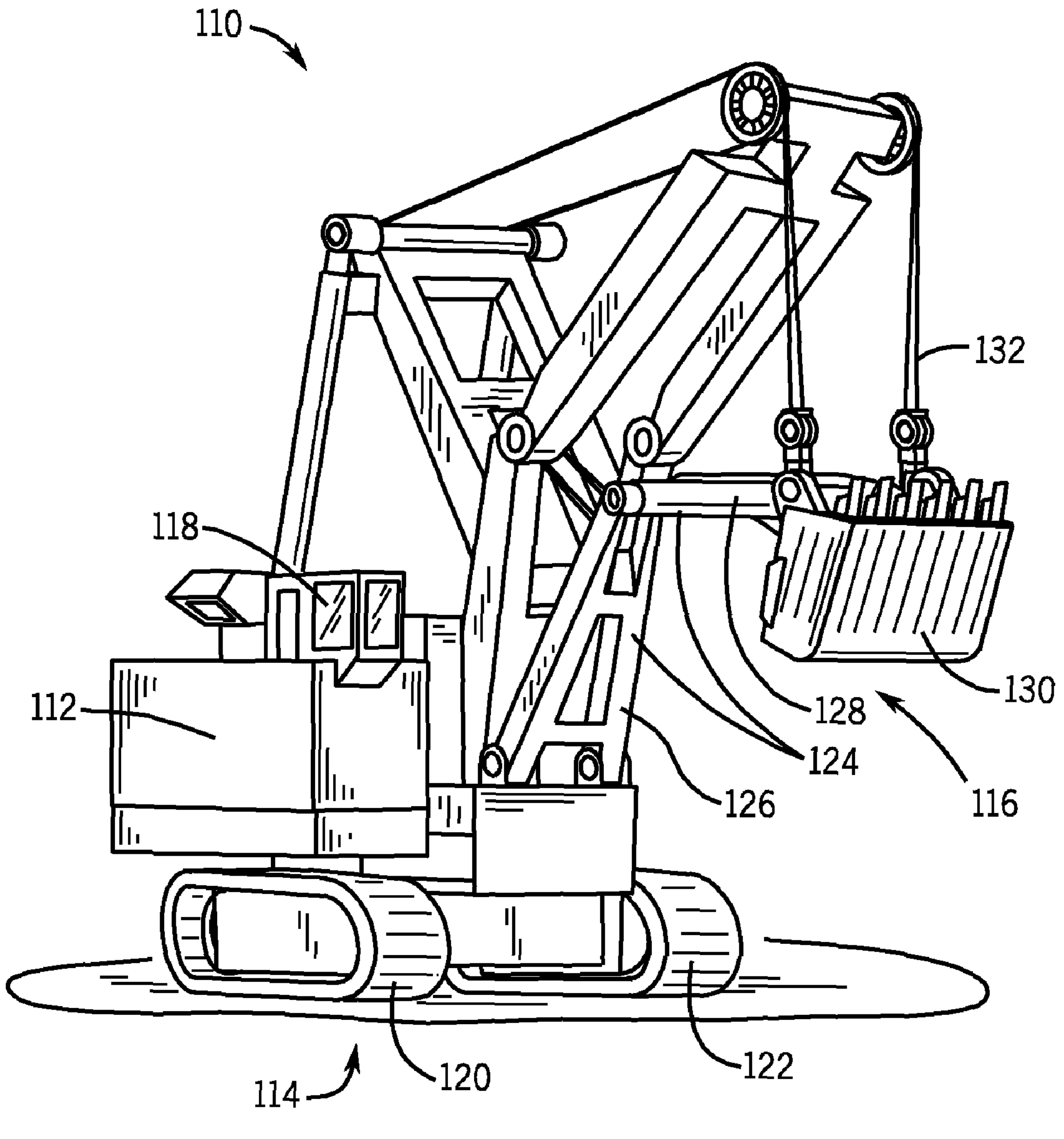
FIG. 1 is perspective view of an electric rope shovel according to an exemplary embodiment.

Referring to FIG. 1, heavy equipment in the form of an electric rope shovel 110 includes a main body 112, a drivetrain 114 (e.g., motor, gearbox, rotating shafts, tracks, wheels, etc.), and a work implement 116 (e.g., shovel, blade, forks, bucket, saw, vibratory plate and associated guiding structure). The electric rope shovel 110 is designed to excavate overburden and ore during mining applications. However, although FIG. 1 shows the heavy equipment in the form of the electric rope shovel 110, in other embodiments a broad range of heavy equipment and other systems benefit from the innovations described herein, including power shovels, small excavators, draglines, backhoes, mobile drills, bulldozers, forklifts, cranes, and other heavy equipment for construction, mining, or other applications.

Figure 2:
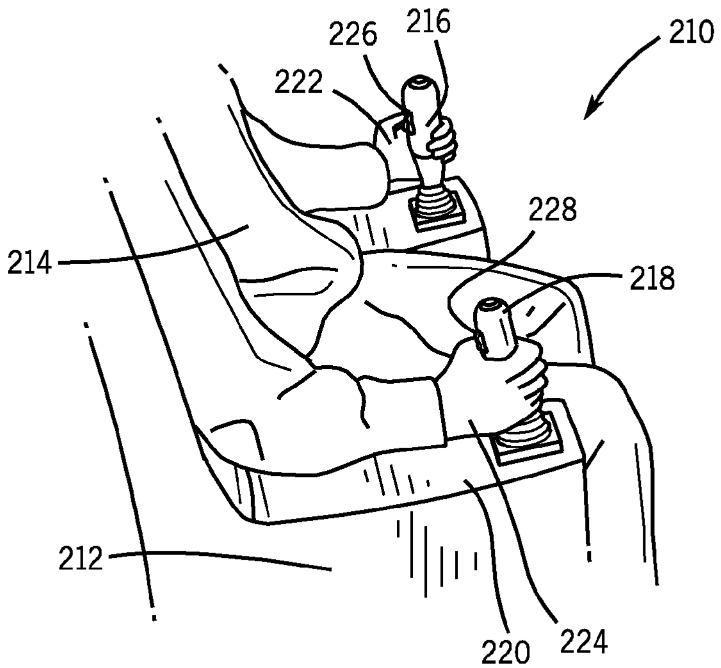
FIG. 2 is a perspective view of a control system according to an exemplary embodiment.

The main body 112 of the electric rope shovel 110 includes an operator cab 118 and components associated with powering the drivetrain 114 and the work implement 116. An operator (see, e.g., operator 214 as shown in FIG. 2) may sit in the cab 118 and control the drivetrain 114 and the work implement 116 by way of a control system (see, e.g., control system 210 as shown in FIG. 2). In other embodiments, the operator may be positioned in a control center that is disconnected from the heavy equipment, and/or the heavy equipment may be partially or fully automated. In some embodiments, the components associated with powering the drivetrain 114 and the work implement 116 include generator sets (e.g., diesel generators), electric drives (e.g., inverters), slew and hoist motors and associated gearing, and other components.

According to an exemplary embodiment, components of the drivetrain 114 of the electric rope shovel 110 include tracks 120, 122 that facilitate movement of the electric rope shovel 110 (i.e., propel). The rate of rotation of the tracks 120, 122 controls the speed of the electric rope shovel 110, and a difference in relative rotation rates of the tracks 120, 122 turns the electric rope shovel 110. For example, when the right track 120 rotates in a forward direction and the left track 122 rotates in a rearward direction, the electric rope shovel 110 turns left. Alternatively, if both tracks 120, 122 rotate in the forward direction, but the left track 122 rotates faster than the right track 120, then the electric rope shovel 110 turns right. In other embodiments, heavy equipment uses motive elements other than tracks, such as wheels, pontoons, etc.

Figure 3:
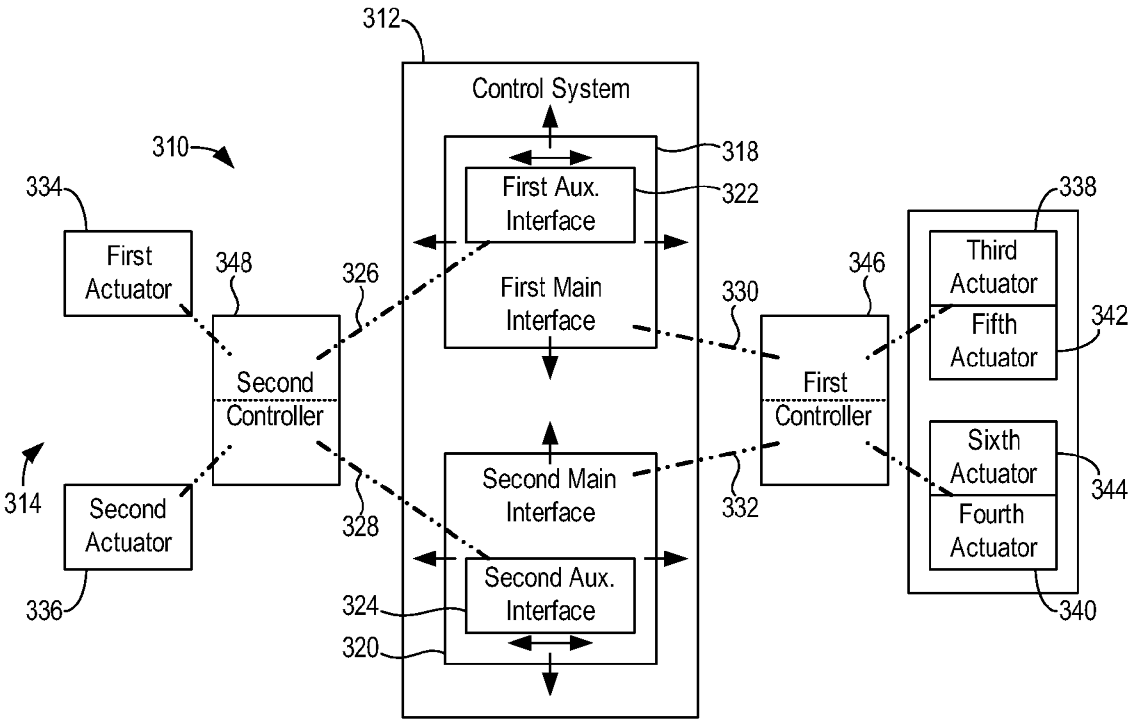
FIG. 3 is a diagram of a control system according to an exemplary embodiment.

According to an exemplary embodiment, the electric rope shovel 110 further includes the work implement 116, which includes an articulated arm 124 formed from a boom 126 coupled to a stick 128 (e.g., dipper). The stick 128 may translate and/or rotate relative to the boom 126. A bucket 130 is coupled to the stick 128 and is designed to collect the overburden and ore. Translational movement of the stick 128 relative the boom 126, such as by way of a hydraulic cylinder, retract ropes (e.g., metal cables), rack and pinion, and/or other systems, facilitates crowding of the bucket 130. Hoist ropes 132 controllably raise and lower the bucket 130. Slew motors (see generally actuator 338 as shown in FIG. 3) coupled to the main body 112 allow for rotation of the main body 112 (e.g., swing) and corresponding movement of the bucket 130 relative to the tracks 120, 122.

Referring now to FIG. 2, a control system 210 includes a support structure 212 (e.g., seat, stool, platform, etc.) for an operator 214, and one or more main interface 216, 218 (e.g., controller, joystick, mouse). In some embodiments, the control system 210 is attached to a cab and/or a main body of heavy equipment (see, e.g., cab 118, main body 112 of electric rope shovel 110 as shown in FIG. 1). In other contemplated embodiments, the control system 210 is remotely located relative to the system or systems controlled thereby and in electromagnetic communication therewith.

According to an exemplary embodiment, the main interfaces 216, 218 are accessible to the operator 214 when the operator 214 is supported by the support structure 212. In some such embodiments, the support structure 212 further includes arm rests 220, and the main interfaces 216, 218 are coupled to the arm rests 220. In other such embodiments, the main interfaces 216, 218 are coupled to a console, a table, or another structure proximate to the support structure 212. The position of the main interfaces 216, 218 relative to the operator 214 and relative to each other may be adjustable or fixed. According to an exemplary embodiment, the main interfaces 216, 218 are located at generally the same vertical height as each other, relative to the operator 214 when the operator 214 is supported by the support structure 212 (e.g., seated). Further, the main interfaces 216, 218 are located at about the same distance from the operator 214 when the operator 214 is supported by the support structure 212.

According to an exemplary embodiment, one of the main interfaces 216, 218 is configured for operation by a left hand 222 of the operator 214 and the other of the main interfaces 216, 218 is configured for operation by the right hand 224 of the operator 214, allowing the operator to control one or more sub-systems. Auxiliary interfaces 226, 228 (e.g., dials, buttons, switches, slides, touch screens, toggles, etc.) integrated with (e.g., attached to, extending from, connected to, contacting) the main interfaces 216, 218 may be ergonomically positioned on the main interfaces 216, 218, allowing the operator 214 control of one or more additional sub-systems with a finger (e.g., index finger, thumb, both middle and ring fingers together, etc.) of the hands 222, 224, while handling the main interfaces 216, 218.

In some embodiments, use of the main interfaces 216, 218 in combination with the auxiliary interfaces 226, 228 allows the operator 214 to control sub-systems without use of foot pedals. Applicants believe that the hand-operated main and auxiliary interfaces 216, 218, 226, 228 allow for improved performance because of fine motor skills associated with hands and fingers. In addition, Applicants believe that the presently described hand-operated main and auxiliary interfaces 216, 218, 226, 228, in place of foot pedals, allow the operator 214 greater comfort with the support structure 212. For example, the operator 214 is free to adjust leg positions while operating the hand-operated main and auxiliary interfaces 216, 218, 226, 228. Accordingly, without impacting operation of the control system 210 in some embodiments, no foot pedals are included for the control of certain sub-systems, such as a drivetrain sub-system (see, e.g., drivetrain 114 as shown in FIG. 1). In other embodiments, foot pedals are used for direct or alternate control of some sub-systems.

Referring to FIG. 3, heavy equipment 310 includes a control system 312, a drivetrain 314, and a work implement 316. The control system 312 includes two or more main interfaces 318, 320, and each main interface 318, 320 includes at least one auxiliary interface 322, 324 integrated therewith. According to an exemplary embodiment, each main interface 318, 320 is configured to provide a signal 326, 328 (e.g., comment, instruction, direction) that is a function of movement of the respective main interface in forward, rearward, left, or right directions, or combinations thereof. Each auxiliary interface 322, 324 provides a signal 330, 332 independent of the signal 326, 328 provided by the respective main interface 318, 320. According to an exemplary embodiment, the auxiliary interfaces 322, 324 are configured to provide signals 330, 332 that are a function of movement in forward and rearward directions.

According to an exemplary embodiment, the drivetrain 314 includes a first actuator 334 (e.g., electric motor, internal combustion engine, hydraulic motor, linear actuator, hydraulic cylinder, solenoid) and a second actuator 336. The work implement 316 includes a third actuator 338 and a fourth actuator 340. According to such an embodiment, the signal 326 provided by the first auxiliary 322 interface controls the first actuator 334 and the signal 328 provided by the second auxiliary interface 324 controls the second main actuator 336. The signal 330 provided by the first main interface 318 controls the third actuator 338, and the signal 332 provided by the second main interface 320 controls the fourth actuator 340.

In contemplated embodiments, the signal 330 provided by the first main interface 318 further controls a fifth actuator 342, and the signal provided by the second main interface 320 further controls a sixth actuator 344. In at least one such contemplated embodiment, the first and second actuators 334, 336 include hydraulic motors that drive respective tracks of heavy equipment (see, e.g., tracks 120, 122 as shown in FIG. 1), the third actuator 338 includes an electric slew motor for rotating a main body (see, e.g., main body 112 as shown in FIG. 1) of the heavy equipment relative to the tracks, the fourth actuator 344 includes a hydraulic cylinder for rotating a boom (see, e.g., boom 126 as shown in FIG. 1) relative to the main body, the fifth actuator 342 includes a hydraulic cylinder for moving (e.g., rotating, translating) a stick (see, e.g., stick 128 as shown in FIG. 1) relative to the boom, and the sixth actuator 344 includes a hydraulic cylinder for rotating a bucket (see, e.g., bucket 130 as shown in FIG. 1) relative to the stick. In other embodiments, the main and auxiliary interfaces 318, 320, 322, 324 provide signals to control other actuators, other numbers of actuators, other motions of actuators, etc.

Still referring to FIG. 3, the heavy equipment 310 further includes a first controller 346 and a second controller 348 (e.g., computer, drive, inverter, valve assembly, etc.), where each controller 346, 348 is configured to operate independently from the other. According to an exemplary embodiment, the first controller 346 is associated with the work implement 316 and the second controller 348 is associated with the drivetrain 314. As such, signals 330, 332 from the main interfaces 318, 320 are provided to the first controller 346 and signals 326, 328 from the auxiliary interfaces 322, 324 are provided to the second controller 348.

In some embodiments, the controllers 346, 348 include inverters or drives associated with each interface and configured to control a flow of electricity (e.g., frequency, amplitude, current, voltage, power, etc.) to respective electric-motor actuators. The inverters or drives may be integrated with the main and auxiliary interfaces 318, 320, 322, 324 of the control system 312 or separately located on the heavy equipment 310. In other contemplated embodiments, the controllers 346, 348 include valves (e.g., system of solenoid-operated cartridge valves) configured to control the flow of pressurized hydraulic fluid to hydraulic actuators.

Figure 4:
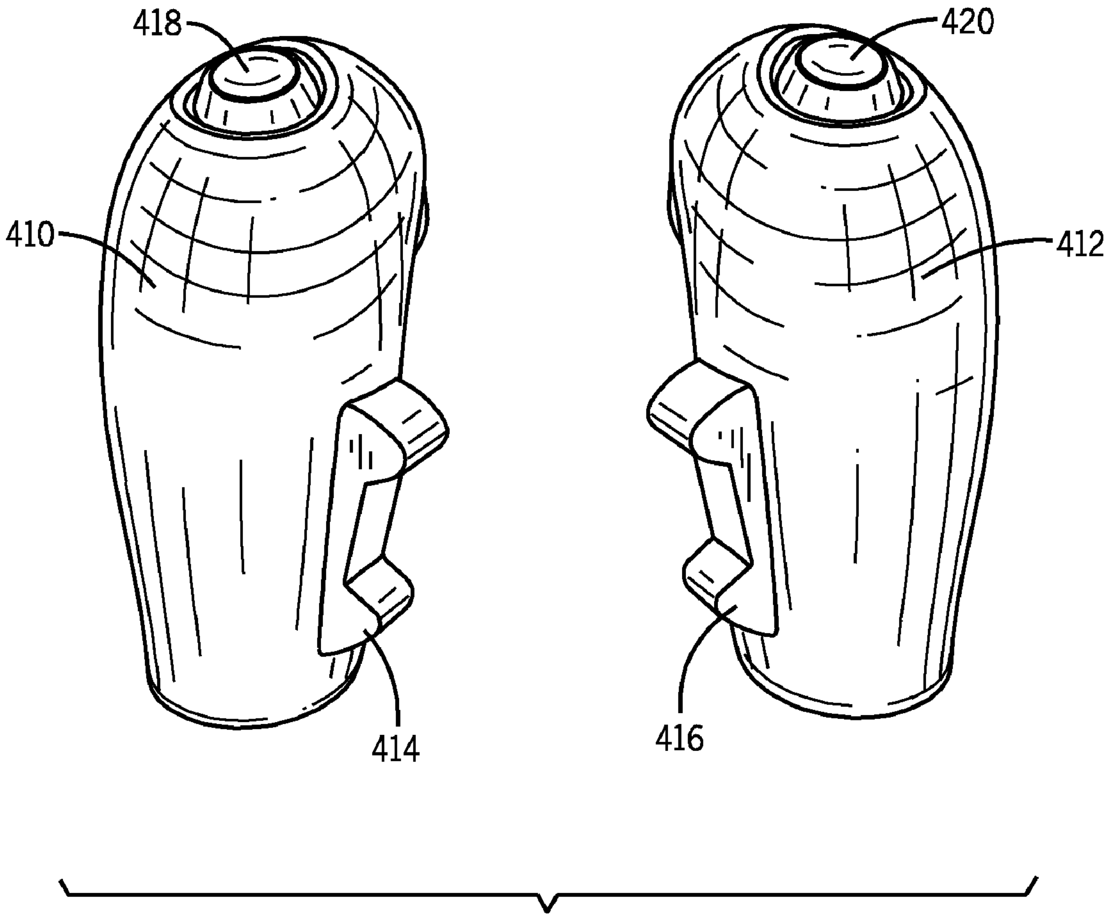
FIG. 4 is a perspective view of joysticks according to an exemplary embodiment.
Figure 5:
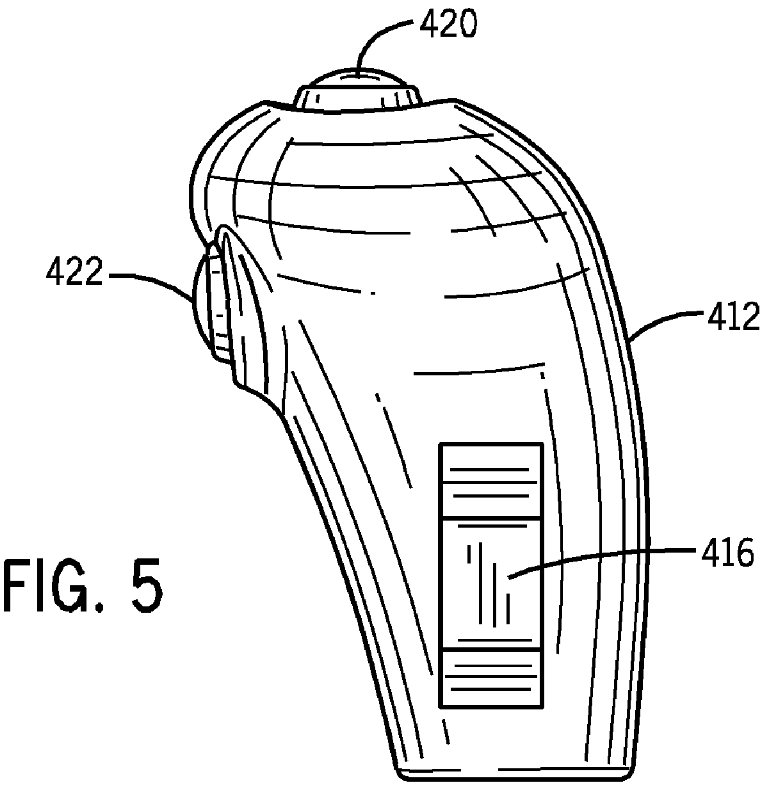
FIG. 5 is a side view of one of the joysticks of FIG. 4.
Figure 6:
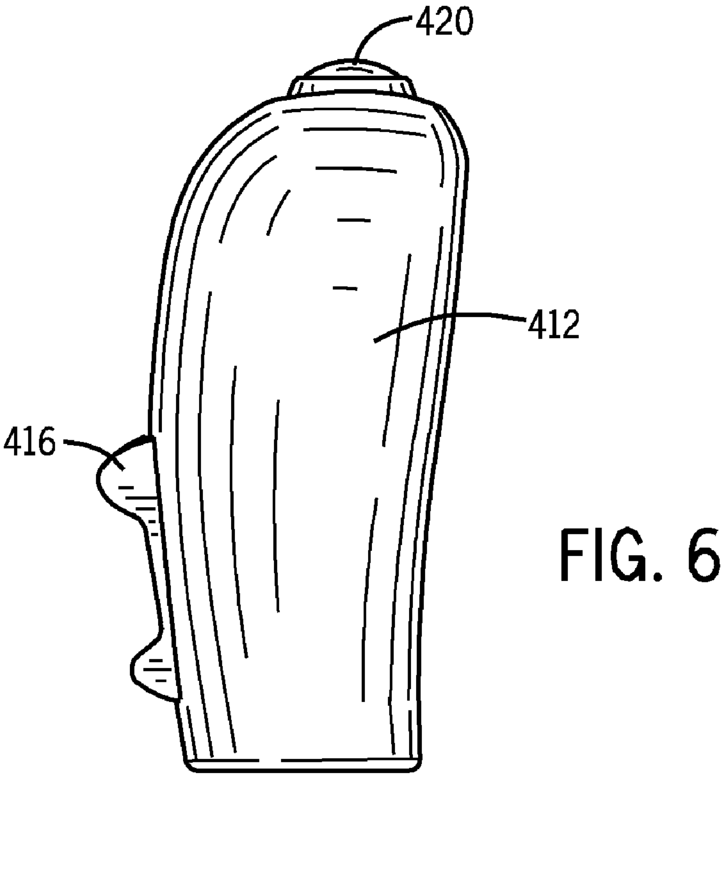
FIG. 6 is a rear view of the joystick of FIG. 5.

Referring now to FIGS. 4-6, joysticks 410, 412 each include auxiliary interfaces 414, 416, 418, 420, 422 (FIG. 5). One joystick 410 is particularly configured for operation by a left hand of an operator (see, e.g., left hand 222 and operator 214 as shown in FIG. 2) and the other joystick 412 is particularly configured for operation by a right hand of the operator (see, e.g., right hand 224 as shown in FIG. 2). In some such embodiments, the joysticks 410, 412 mirror each other, having curvature and auxiliary interfaces 414, 416, 418, 420, 422 symmetrically arranged about a center plane defined between the joysticks 410, 412. In other embodiments, the joysticks include different contours and/or auxiliary interfaces.

According to an exemplary embodiment each joystick 410, 412 may be rotated in at least four directions, such as forward, rearward, left, and right. In some embodiments, each joystick 410, 412 has a ball or gimbaled joint, and is configured to freely rotate in at least two degrees of freedom about the ball or gimbaled joint (i.e., moveable in a full 360-degrees). In still other embodiments, one or more of the joysticks 410, 412 is limited to a single degree of freedom, such as forward or rearward rotation about a fixed axis.

According to an exemplary embodiment, operation of each joystick 410, 412 is used to generate a signal (e.g., electric signal, mechanical motion, flow of fluid, optical signal, etc.) that is at least partially a function of the position, movement, velocity, rotation, translation, loading, and/or another state of the respective joystick 410, 412. According to such an exemplary embodiment, electro-mechanical components, such as switches, potentiometers, variable resistors, sensors (e.g., load cells, accelerometers) and/or other components are coupled to the joysticks 410, 412 and provide the signal, which is responsive to the state of the joystick 410, 412.

The signal may be an analog or digital signal. In some embodiments, an analog signal is converted to a digital signal, filtered, and conditioned by an associated computer. In other embodiments, a mechanical or hydraulic linkage transmits the signal. In still other embodiments, other methods are used to convert the state of the joystick to a corresponding signal. According to an exemplary embodiment, signals provided by the joysticks 410, 412 are used to control a work implement of heavy equipment, such as the movement of a bucket relative to the ground (see, e.g., bucket 130 as shown in FIG. 1). In other embodiments, the signals provided by the first and second joysticks control other features or operations of a sub-system associated with the heavy equipment (e.g., dipper crowding, plow angle, adjustment breaker orientation control, etc.).

Still referring to FIGS. 4-6, the joysticks 410, 412 further include the auxiliary interfaces 414, 416. In some embodiments, the auxiliary interfaces 414, 416, 418, 420, 422 for each joystick include a switch 414, 416 (e.g., rocker switch). According to an exemplary embodiment, each switch 414, 416 is lengthwise oriented along a longitudinal axis of the corresponding joystick 410, 412, and moves (e.g., slides, rocks, rotates) relative to the joystick 410, 412. In some such embodiments, the switches 414, 416 are located on a rearward side of the joysticks 410, 412, angled inward toward each other, and ergonomically configured for control by thumbs of the operator. According to an exemplary embodiment, the switch 414 on the left joystick 410 is used to control a left track of heavy equipment (e.g., propel function), and the switch 416 on the right joystick 412 is used to control a right track.

In some embodiments the switches 414, 416 are rocker switches, and the motion of each switch 414, 416 is limited to rotation about a single axis (i.e., two directions), and provides a control signal (e.g., related to speed, direction, torque, etc.) that is proportional to the direction and amount of rotation about the axis. As such the rotation direction of the respective track corresponds to the direction that the switch 414, 416 is rotated, and the rotational speed of the respective track corresponds to the degree to which the switch 414, 416 is rotated.

The control signal may be linearly related, exponentially related, or otherwise related to the movement. In other contemplated embodiments, one or more rocker switches may rotate in more than two directions, to control multiple parameters (e.g. direction and speed) of one or more sub-systems by way of a single switch, for example.

Figure 7:
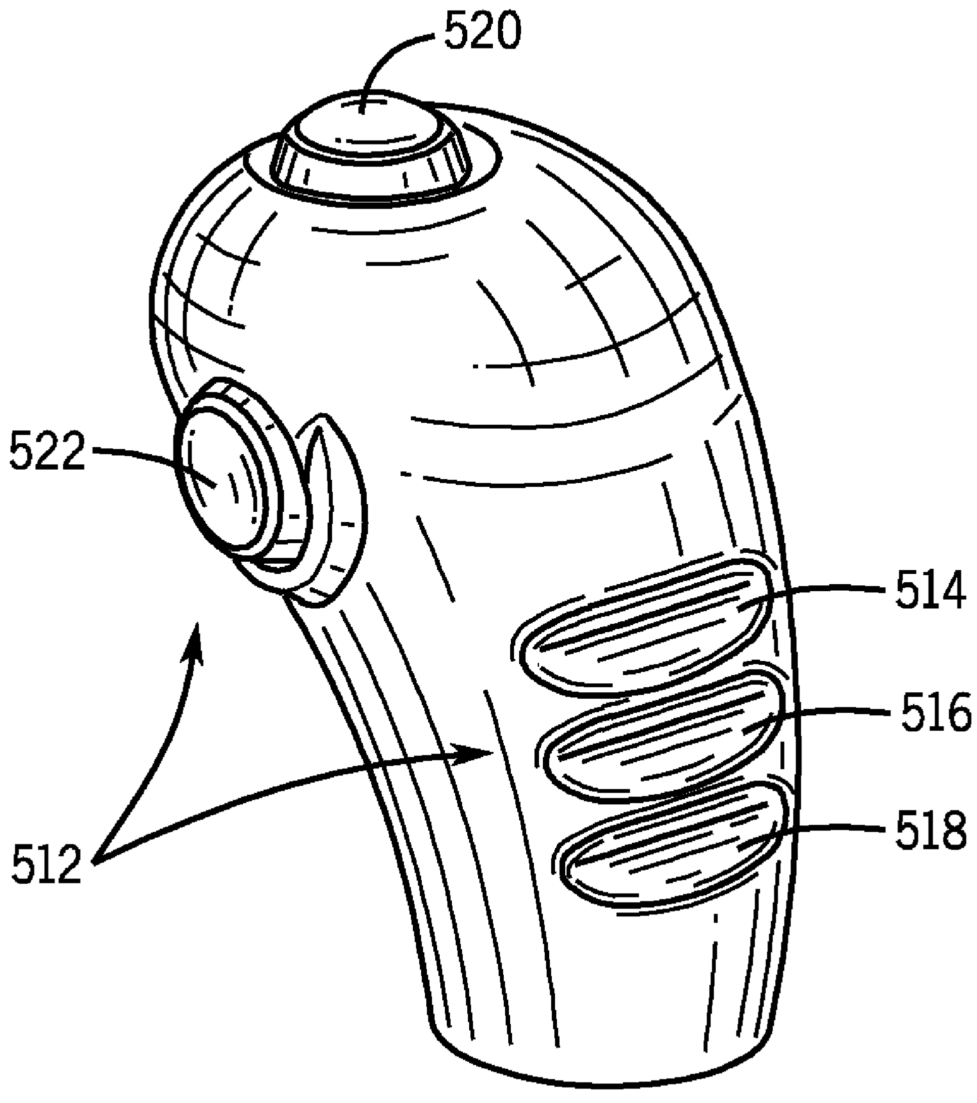
FIG. 7 is a perspective view of a joystick according to another exemplary embodiment.

Referring to FIG. 7, another joystick (see also joysticks 410, 412 as shown in FIGS. 4-6) has auxiliary interfaces 512 including buttons 514, 516, 518, 520, 522. In other contemplated embodiments, one or more of the buttons 514, 516, 518, 520, 522 may instead be finger grooves or contours of the joystick. The motion of each button 514, 516, 518, 520, 522 is limited to translation in a single degree of freedom, such as in and out of the joystick. In some embodiments, one or more of the buttons 514, 516, 518, 520, 522 provides a control signal that is proportional to the number of times the button 514, 516, 518, 520, 522 is operated. In some embodiments, the auxiliary interface 512 may include two or more such buttons 514, 516, 518 on the same joystick, where one button 514 is associated with a forward direction and another button 516 is associated with a rearward direction of motive elements of heavy equipment, or where one button 514 is associated with an increase in rate, torque, load, etc. and the other button 516 is associated with a decrease for a work implement. Other buttons 518, 520, 522 may reset the signal to an initial setting, provide a stop signal, provide instructions to maintain current settings, release overburden from a bucket into a haul truck, or provide other instructions.

In some embodiments, one or more of the buttons 514, 516, 518, 520, 522 provides a signal, which is proportional to the length of time that the button 514, 516, 518, 520, 522 is held down, the length of time since the button 514, 516, 518, 520, 522 was initially pressed, the force applied to the button 514, 516, 518, 520, 522, and/or another interaction parameter. In one such contemplated embodiment, upon pressing of a first button, a control computer provides a ramping of speed, load, rate of rotation, etc., which is slowly increased until a second button is pressed, or until the first button is pressed a second time.

In still other embodiments, other control modes are contemplated where the buttons 514, 516, 518, 520, 522 may otherwise be used to control tracks, articulated arm segments, or other sub-systems of heavy equipment. In some such embodiments, the operator may be simultaneously providing a first signal via movement of the joystick with a right or left hand, providing a second signal via the buttons 514, 516, 518 with the corresponding thumb, and providing a third signal via the button 522 with the corresponding index finger. In other embodiments, the joysticks further or otherwise include additional auxiliary interfaces, such as triggers, buttons, or toggles on the tops and/or sides of the joysticks.

The construction and arrangements of the control system and heavy equipment, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. Heavy equipment, comprising:

a main body;

a drivetrain coupled to the main body and configured to facilitate movement of the heavy equipment, wherein the drivetrain comprises:

a first actuator, and a second actuator, wherein the first and second actuators provide both speed and direction for the movement of the heavy equipment;

a work implement coupled to the main body, wherein the work implement comprises:

a third actuator, and a fourth actuator, wherein the third and fourth actuators provide the position and orientation of the work implement;

a control system for the heavy equipment allowing an operator to simultaneously control the drivetrain and the work implement, the control system comprising:

a first main interface configured for operation by a first hand of the operator, wherein the control system operates the third actuator at least partially as a function of a signal provided by the first main interface;

a first auxiliary interface integrated with the first main interface, wherein the first auxiliary interface is configured for simultaneous operation with the first main interface by a finger of the first hand, and wherein the control system operates the first actuator at least partially as a function of a signal provided by the first auxiliary interface;

a second main interface configured for operation by a second hand of the operator, wherein the control system operates the fourth actuator at least partially as a function of a signal provided by the second main interface; and a second auxiliary interface integrated with the second main interface, wherein the second auxiliary interface is configured for simultaneous operation with the second main interface by a finger of the second hand, and wherein the control system operates the second actuator at least partially as a function of a signal provided by the second auxiliary interface.

2. The heavy equipment of claim 1, wherein the drivetrain further comprises:

a first track, and a second track, wherein the first actuator drives the first track and the second actuator drives the second track.

3. The heavy equipment of claim 2, wherein the work implement further comprises:

an articulated arm extending from the main body, and a bucket on an end of the articulated arm, wherein the third and fourth actuators move the bucket.

4. The heavy equipment of claim 3, wherein the first and second auxiliary interfaces allow for proportional control of the respective first and second actuators, controlling both the speed and the direction of the respective first and second actuators at least partially by way of the respective signals provided by the first and second auxiliary interfaces, allowing the operator the ability to change the speed and direction of the heavy equipment via the first and second auxiliary interfaces, while simultaneously controlling the work implement via the first and second main interfaces.

5. The heavy equipment of claim 4, wherein the first and second main interfaces each include a respective joystick, and wherein the first and second auxiliary interfaces each include a rocker switch positioned on a side of the respective joystick of the first and second main interfaces.

6. The heavy equipment of claim 5, wherein a movement of each rocker switch in a first direction instructs the respective first or second actuator to move the respective track in a forward movement at a speed proportional to the magnitude of the movement in the first direction, and wherein a movement of each rocker switch in a second direction instructs the respective first or second actuator to move the respective track in a backward movement at a speed proportional to the magnitude of the movement in the second direction.

7. Heavy equipment configured for mining, excavation, and construction applications, comprising:

a main body configured to support an operator of the heavy equipment;

a drivetrain coupled to the main body and configured to facilitate movement of the heavy equipment, wherein the drivetrain comprises:

a first actuator, a first track coupled to the first actuator, a second actuator, and a second track coupled to the second actuator, wherein the first and second actuators drive the respective tracks;

a work implement coupled to the main body, wherein the work implement comprises:

a third actuator, and a fourth actuator, wherein the third and fourth actuators provide the position and orientation of the work implement;

a control system for the heavy equipment coupled to the main body, and allowing the operator to simultaneously control the drivetrain and the work implement from the main body, the control system comprising:

a first joystick, wherein the control system operates the third actuator at least partially as a function of a signal provided by the first joystick;

a first switch integrated with the first joystick, wherein the control system operates the first track by way of the first actuator at least partially as a function of a signal provided by the first switch, and wherein the signal provided by the first switch is independent from the signal provided by the first joystick;

a second joystick, wherein the control system operates the fourth actuator at least partially as a function of a signal provided by the second joystick; and a second switch integrated with the second joystick, wherein the control system operates the second track by way of the second actuator at least partially as a function of a signal provided by the second switch, and wherein the signal provided by the second switch is independent from the signal provided by the second joystick;

wherein the first and second switches may each be used to change the rotation speed and direction of the respective track, together controlling the speed and direction of the heavy equipment.

8. The heavy equipment of claim 7, wherein the speed of each track is proportionally controlled as a function of the direction and magnitude of movement of the respective switch.

9. The heavy equipment of claim 7, wherein the speed of each track is proportionally controlled as a function of time elapsed following operation of the respective switch.

10. The heavy equipment of claim 7, wherein the speed of each track is proportionally controlled as a function of the number of times that the respective switch is operated.

11. The heavy equipment of claim 7, wherein each switch is positioned on a side of the respective first and second joystick.

12. The heavy equipment of claim 11, wherein each switch is positioned on a rear, inward side of the respective joystick, and is configured for operation by thumbs of the operator, when the operator is seated behind the joysticks and gripping the joysticks.

13. The heavy equipment of claim 12, wherein the work implement further comprises:

an articulated arm extending from the main body, and a bucket on an end of the articulated arm, wherein the third and fourth actuators move the bucket.

14. A control system for operating two or more sub-systems, comprising:

a first joystick moveable in at least four directions, wherein the first joystick provides a first signal that is at least partially a function of the direction in which the first joystick is moved;

a first auxiliary interface integrated with and coupled to a side of the first joystick, wherein the first auxiliary interface is operable in at least two positions, and wherein the first auxiliary interface provides a second signal that is at least partially a function of the position in which the first auxiliary interface is operated;

a second joystick moveable in at least four directions, wherein the second joystick provides a third signal that is at least partially a function of the direction in which the second joystick is moved; and a second auxiliary interface integrated with and coupled to a side of the second joystick, wherein the second auxiliary interface is operable in at least two positions, and wherein the second auxiliary interface provides a fourth signal that is at least partially a function of the position in which the second auxiliary interface is operated;

wherein the first and third signals together at least partially control the operation of a work-implement sub-system, and wherein the second and fourth signals together at least partially control the operation of a propel sub-system;

wherein the work-implement and propel sub-systems are simultaneously controllable independent of each other by way of the respective joysticks and auxiliary interfaces.

15. The control system of claim 14, wherein the control system allows for full control of the propel sub-system without the use of foot pedals.

16. The control system of claim 15, wherein the first and second auxiliary interfaces each include a switch, and wherein the second and fourth signals provide proportioned control instructions that are at least partially a function of the direction and magnitude of movement of the respective switch, the time elapsed following operation of the respective switch, and the number of times that the respective switch is operated.

17. The control system of claim 16, further comprising:

a first inverter system for controlling electricity supplied to the work-implement sub-system at least partially as a function of the first and third signals; and a second inverter system for controlling electricity supplied to the propel sub-system at least partially as a function of the second and fourth signals;

wherein the first and second inverter systems are configured for simultaneous and independent operation with respect to each other.

18. The control system of claim 16, wherein the first auxiliary interface is configured to be operated by right thumb of a right hand of an operator when the operator is gripping the first joystick with the right hand, and wherein the second auxiliary interface is configured to be operated by a left thumb of a left hand of the operator when the operator is gripping the second joystick with the left hand.

19. The control system of claim 16, wherein the second and fourth signals provide instructions for speed and direction of tracks of the propel sub-system, and wherein the first and third signals provide instructions for control of a bucket of the work-implement sub-system.

20. The control system of claim 16, wherein the first and second auxiliary interfaces each include a group of two or more buttons, and wherein the second and fourth signals are at least partially a function of the particular buttons pushed of the respective group of two or more buttons.

* * * * *